T. H. Powers,
Water Wheel.
No. 101,036. Patented Mar. 22. 1870.
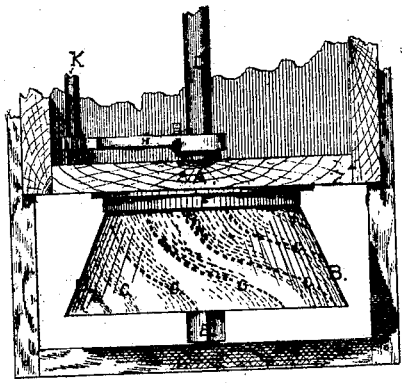
FIG. I.
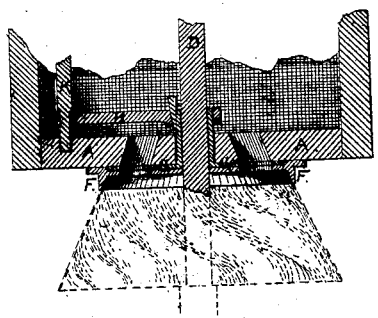
FIG. II.
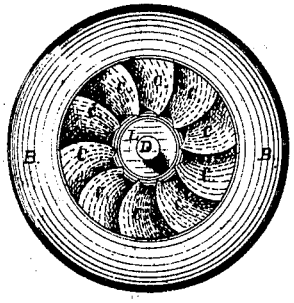
FIG. III.
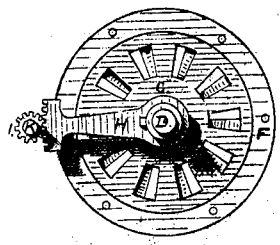
FIG. IV.
WITNESS.
J. B. Smith
William Hornor.
INVENTOR.
Thos. H. Powers

United States Patent Office.

THOMAS H. POWERS, OF MILWAUKEE, WISCONSIN, ASSIGNOR TO HIMSELF, GEORGE E. BURNHAM, AND DANIEL G. ROGERS, OF SAME PLACE.

Letters Patent No. 101,036, dated March 22, 1870.

IMPROVEMENT IN WATER-WHEELS.

The Schedule referred to in these Letters Patent and making part of the same.

I, THOMAS H. POWERS, of Milwaukee, in the county of Milwaukee and State of Wisconsin, have invented certain Improvements in Water-Wheels, of which the following is a specification.

Nature and Object of the Invention.

The nature of my invention is to give direction to the water on the wheel, so as to get the greatest amount of power out of it, by employing the centrifugal force of the water on the wheel, by applying it near the center, and discharging it at or near the periphery of the wheel.

Description of the Drawings Accompanying and Forming Part of this Specification.

Figure I is a side view.
Figure II is a sectional view.
Figure III is a top view of the wheel.
Figure IV is a top view of the gate and gate-case, and the apparatus for opening the gate.

A is the bottom of the flume, through which there are holes made of the proper slant for the water to pass through the gate to the wheel.

B, the outside curb of the wheel. This curb is fastened to the outside of the buckets, and revolves with the wheel.

C, the buckets of the wheel. These buckets start from near the center of the wheel, and wind around the wheel a quarter turn, more or less, and swell out and discharge the water near the outside of the wheel, forming the frustum of a cone.

D, the wheel-shaft.

E, the step of the shaft.

F, an iron case for the gate, with openings through it for the water to pass through to the wheel. This case has a flange on its bottom, which comes down over the top of the wheel, and is fitted and fastened to the bottom of the flume, and the wheel revolves its top in this case.

G, the gate. This gate is a flat circular plate of metal, with holes in it corresponding with the holes in the case and the bottom of the flume, and is operated by the arm H, which is attached to it.

The pinion I and shaft K are turned to open or close the gate, and let on water, or shut it off, as desired.

L is the central piece of the wheel.

To put this wheel in operation, when it is set under the bottom of a flume, and the flume is filled with water, turn shaft K, and pinion I, meshing into arm H, will revolve the gate, and let water to the wheel. The water enters the buckets, and its weight, pressing on them, turns the wheel, and, as it passes down over the buckets, it runs out, as shown, and discharges near the periphery of the wheel, this giving centrifugal motion as well as weight, and I claim adds power to the wheel.

Claims.

I claim as my invention—

1. A water-wheel, consisting of central piece L, shaft D, buckets C, and shell B, substantially as described.

2. Gate-case F, gate G, arm H, pinion I, and shaft K, substantially as described.

Witnesses:  THOS. H. POWERS.
  J. B. SMITH,
  WILLIAM HORNOR.